E. E. GREVE.
SWIVEL FOR ROTARY WELL DRILLING RIGS.
APPLICATION FILED FEB. 24, 1917.
1,259,853.
Patented Mar. 19, 1918.
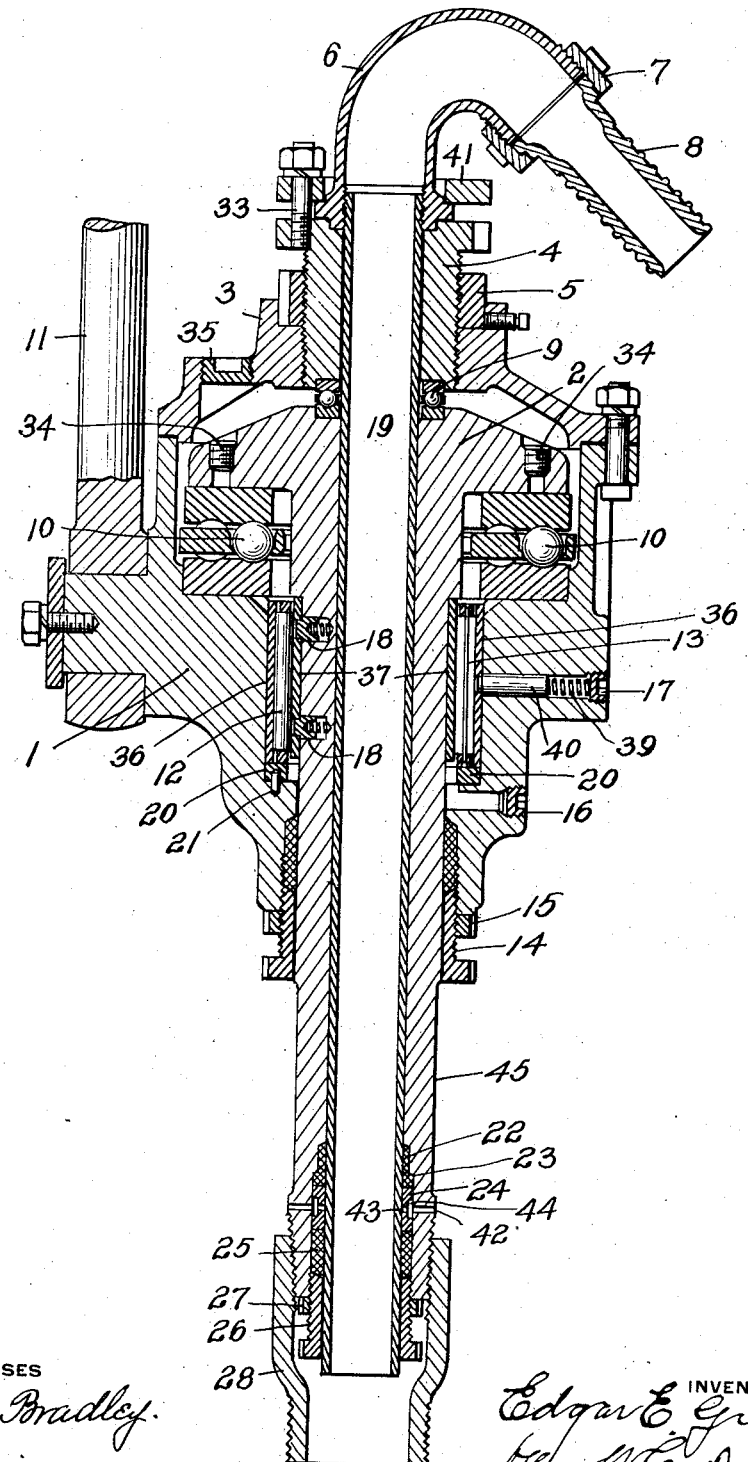

UNITED STATES PATENT OFFICE.

EDGAR E. GREVE, OF BELLEVUE, PENNSYLVANIA, ASSIGNOR TO OIL-WELL SUPPLY COMPANY, OF PITTSBURGH, PENNSYLVANIA, A CORPORATION OF PENNSYLVANIA.

SWIVEL FOR ROTARY WELL-DRILLING RIGS.

1,259,853.  Specification of Letters Patent.  Patented Mar. 19, 1918.

Application filed February 24, 1917. Serial No. 150,693.

*To all whom it may concern:*

Be it known that I, EDGAR E. GREVE, a citizen of the United States, residing at Bellevue, in the county of Allegheny and State of Pennsylvania, have invented certain new and useful Improvements in Swivels for Rotary Well-Drilling Rigs, of which the following is a specification.

My invention relates to swivels for rotary well drilling rigs, and its objects are to prolong the life of the swivel and avoid loss of time in making repairs by the provision of means for inclosing and thus protecting the bearings and other relatively movable parts of the swivel; to provide means to permit a free relative rotation of the body and head and to prevent friction between these parts when the weight of the swivel is supported by the pipe and removed from the bail; to provide anti-friction means for preventing side thrust and means for enabling such parts to be readily removed; to provide effectively for the adjustment of the bearings; to guard the bearings of the head against mud and liquid; to provide means for the escape of mud, or water or oil should they enter between the pipe and head, and to enable leaking of the packings to be indicated; to provide means for preventing roughening of the surface of the head by the tongs; to provide for the effective retention of the lubricant in the head and body, and to generally improve the construction of swivels for rotary drilling apparatus.

With these objects in view, my invention is embodied in preferable form in the construction, arrangement and combination hereinafter set forth and illustrated in the accompanying drawing.

The drawing shown is a vertical section of the improved swivel, one-half being taken on a plane at right angles to the other half.

Referring to the drawing, 1 is the body of the swivel, consisting of an annular casing surrounding the head and water-pipe and the bearings, and adapted to be pivotally suspended by a bail from a hoisting block, as is usual, and within which body the head and pipe are adapted to rotate in the relative swiveling action of the parts. The head 2 is supported on anti-friction bearings in the body and has an elongated depending cylindrical sleeve or stem inclosing the water pipe to the lower end of the latter and engaging a coupling adapted to connect to the drill pipe. A swivel cap 3, covers the head and is rigidly secured to the body 1 by bolts. Threaded in the central bore of this cap is an adjusting bushing 4, surrounding the water pipe and movable longitudinally thereof for taking up wear on the bearings 9. A lock nut 5 engages the bushing and serves to fix it in place after adjustment.

Threaded onto the upper end of the water pipe is a goose-neck 6, connected by a union nut 7 to a hose nozzle 8, which is adapted to connect as is usual to a hose adapted to carry mud and water from the pump to the water pipe.

Between the head and the bushing are mounted the ball bearings 9 which perform the important function of supporting anti-frictionally the upper portion of the swivel or the body, bail, cap, etc., when the bail hangs loose and does not suspend the swivel, as when the end of the drill pipe is resting against the bottom of the well. In this position, the bearings 9 take the weight of the body, etc., and they serve to prevent friction between the head and upper part of the swivel, thus lessening wear of the parts and preventing binding of the swivel and consequent twisting of the drill lines. These bearings thus constitute a highly advantageous feature of my invention. The adjustable bushing 4 for taking up wear in the bearings and from which the cap and body are suspended is an important adjunct of this feature. It will be noted that the bearings 9 are completely protected against dust and dirt in the atmosphere by the inclosing cap and the head and bushing, and also from mud and liquid by the threaded connection between the upper end of the water pipe and the goose neck, and the packings hereinafter described.

Mounted between the body 1 and the head 2 are the main roller bearings 10 which support the swivel head which in turn carries the load of the drill pipe. These bearings are surrounded at their inner periphery by the annular wall of the cylindrical stem of the head and at their outer periphery by a cylindrical annular flange extending upwardly from the body 1 which flange meets and is clamped against the protecting cap 3. By means of this arrangement it will be seen that the bearings are entirely inclosed and protected against the atmosphere and are also spaced from the pipe by the head so that there is no possibility of mud or water entering the bearings from the former part.

Pivotally mounted on trunnions extending from the body 1 is a suspending bail 11 of the usual construction and which is adapted to be supported by a hook depending from the hoisting block as is usual in hydraulic rotary drills.

Mounted between the body and the cylindrical stem of the head, below the main bearings 10, are vertical roller bearings 12 adapted to take the side thrust of the head. 13 designates vertical rods connecting the rings of these bearings and which rings and rods constitute a cage whereby the bearings may be lifted out as a body from the swivel. Between the stem of the head and the lower annular portion of the body is mounted a gland 14 threaded into the body and adapted to pack off the swivel head from the body and thereby retain the lubricating oil in the latter. A lock nut 15 is provided for this gland 14. Above the gland and in a passageway projecting laterally through the body 1 is mounted a drain plug 16, whereby the oil may be drained from the swivel body. 17 is a screw plug threaded into a lateral passageway extending through the body 1 and bearing against a spring 39, which in turn bears against a retaining pin 40, which acts to retain the outer liner 36 of the roller bearings 12 in place. 37 is the inner liner for these bearings and 18 are spring actuated plugs for holding said inner liner 37 in place. The roller bearings 12 are adapted to revolve on a ring or plate 20 supported on an inwardly projecting flange of the body 1, and 21 is a pin for holding this plate in position. The water pipe or tube 19 is threaded at its upper end into the goose neck and at its lower end is in communication with a coupling which in turn is connected with the drill pipe.

It will be understood that the pipe or tube 19 forms a passageway for the mud laden fluid from the pump to the drill stem as is customary in hydraulic rotary drilling apparatus and that the tube and head are separated by a slight clearance and it is important to prevent the mud and water from entering the space between the pipe and the head and thence working into the bearings, and also important to prevent the escape of the oil. Formed in the stem of the head near the lower end of the same is a longitudinally elongated annular recess 22 adapted to receive a packing between the stem and the pipe. Below the packing in this chamber the stem of the head is provided with an inwardly projecting abutment shoulder 23. The packing in the space 22 extends inside of this shoulder and slightly below the same. This shoulder is adapted to serve as a limiting stop or abutment for a separator ring 24 mounted below the shoulder and which ring is provided with a vertical recess 44 forming a small annular chamber. Through the vertical wall of this separator ring are formed horizontal passageways 43 leading from the space between the water tube 19 and the stem of the head 2 and adapted to register with a lateral port or ports 42 leading through the wall of the stem to the atmosphere and which passageways 43 and ports 42 are adapted to permit the escape of mud or water or oil from between the pipe and stem, and thus to prevent the passage of the mud or water to the gland 22 and also to serve as indicating means whereby the leaking of the packings may be detected and the glands may be tightened accordingly to prevent the leaking.

Below the separator ring 24 is a packing 25 adapted to be pressed against by a gland 26 which carries a lock nut 27. The packing 25 is for the purpose of preventing the entrance of mud and water from the pipe 19 into the space between said pipe and the stem of the head. The shoulder 23 prevents the separator ring from being pushed upwardly in the compressing action on the packings 25 and 22, and thus prevents the passageways 43 from being pushed past the port 42, thereby maintaining registry between the passage and the port at all times. By the provision of shoulder 23, the separator can be pushed up tightly against the same in the compressing action against the packing and the port will still remain open and if the oil then leaks out, the separator ring must be removed and new packing inserted.

The lower end of the stem of the head is threaded into a screw coupling 28, which serves to connect the swivel head with the drill pipe.

The diameter of a portion of the stem is slightly reduced as indicated at 45. This reduced portion 45 is adapted to be engaged by grappling tongs in screwing the swivel into the pipe. By making the diameter of the stem slightly reduced, as stated, any cutting or burring caused by the grappling tongs on such portion will not interfere with the free withdrawal of the head through the body of the swivel, when it is desired to separate the parts.

Mounted on a shoulder of the gooseneck is a clamping plate 41 which is adapted to be fixed to the bushing 4 by means of bolts 33.

Formed in the upper surface of the flange of the head 2 are tap recesses 34 which are adapted to receive means for use in elevating the head 2, when dismantling the apparatus.

In the cap 3 is provided a screw plug 35 adapted to close an opening through which oil is supplied to the head and bearings.

It will be seen that the above construction and arrangement provides a swivel in which the bearings are entirely inclosed from the atmosphere and thereby protected against the entrance of dust and dirt and in which the oil is effectively retained within the head and any leaking thereof indicated to the operator by its escape through the port 42 so that the packings may be tightened and also any mud and water that may enter between the pipe and the head led off through the port 42, before they reach the upper packing 22 and also that all these packings may be readily tightened and removed by means of the glands and the separating ring. It will also be seen that the necessary anti-friction action between the swiveling parts of the device when the drill is resting at the bottom of the well and consequently the weight is not suspended from the bail is effectively taken care of by means of the bearings 9 which can be readily adjusted by the bushing which is accessible from the exterior.

The side thrust bearings together with their feature of ready removability as an entirety, also constitute an important feature.

What I claim is:—

1. In swivels for well drilling apparatus, the combination of a body, a swivel-stem having a head, a centrally apertured cap secured to the body, an adjustable load carrying plug entered in the cap opening, a lock nut therefor, and an anti-friction bearing between the upper face of the head and the inner end of the plug.

2. In swivels for well drilling apparatus, the combination of a body, a swivel-stem having a head, a cap having a centrally disposed threaded aperture, a threaded adjustable plug entered in the cap-aperture, a lock nut therefor, and an anti-friction bearing between the upper face of the head and the inner end of the plug.

3. In swivels for well drilling apparatus, the combination of a body, a swivel-stem having a head, a centrally apertured cap secured to the body, an adjustable plug to which the cap is connected, anti-friction bearings between the upper face of the head and the inner end of the plug, a goose-neck, and means for detachably clamping the goose-neck to the plug.

4. In swivels for well drilling apparatus, the combination of a body, a centrally apertured cap for the body, a swivel-stem having a head, means connected to the body for suspending the swivel, anti-friction bearings between the head and body and adapted to carry the load when the swivel is suspended, means adapted to carry the weight of the body when the head is supported from below including an adjustable plug entered in the opening of the cap and anti-friction means between the head and the plug.

5. In swivels for well drilling apparatus, the combination of a body, a centrally apertured cap for the body, a swivel-stem having a head, means connected to the body for suspending the swivel, anti-friction bearings between the head and body and adapted to carry the load when the swivel is suspended, means adapted to carry the weight of the body when the head is supported from below including an adjustable plug entered in the opening of the cap and anti-friction means between the head and the plug, and an anti-friction side thrust bearing between the stem and body and below the first bearings.

6. In swivels for well drilling apparatus, the combination of a tube carrying body, a centrally apertured cap for the body, a hollow adjustable member entered in the cap body from which the cap and body are suspended, a swivel head within said body, said head and body provided with opposing laterally projected horizontal bearing surfaces, anti-friction bearings between said surfaces adapted to take the load when the swivel is suspended, anti-friction bearings between the head and hollow member and above the first bearings adapted to carry the load when the swivel is supported from below the same, and said head having a depending stem and anti-friction side thrust bearings between said stem and body and below the first bearings.

7. In swivels for well drilling apparatus, the combination of a body, a swivel-stem having a head and a lower threaded end for engagement with the drill pipe, said stem below its head having a portion of its exterior recessed to form tong engaging means whereby the stem may be engaged by the tongs within the peripheral surfaces thereof, thereby preventing cutting or burring sufficient to interfere with the free withdrawal of the stem through the body, substantially and for the purpose described.

In testimony whereof I affix my signature in presence of two witnesses.

EDGAR E. GREVE.

Witnesses:
  LOIS URNEINAN,
  ALICE B. DICE.